United States Patent Office 3,502,701
Patented Mar. 24, 1970

1

3,502,701
UNSYMMETRICAL DIACYL PEROXIDES
Roger N. Lewis, Pinole, and Donald W. Wood, San Pablo, Calif., assignors to Argus Chemical Corporation, a corporation of Delaware
No Drawing. Filed May 18, 1967, Ser. No. 639,314
Int. Cl. C07c 73/02
U.S. Cl. 260—610
1 Claim

ABSTRACT OF THE DISCLOSURE

Low molecular weight acyclic (6–9 carbon atoms) unsymmetrical diacyl peroxides and unsymmetrical acyclic-cyclic diacyl peroxides in which one of the acyl groups has a secondary or tertiary carbon atom in the alpha or beta position useful as polymerization initiators.

---

This invention relates to organic peroxide compositions. More particularly, the invention relates to low molecular weight acyclic unsymmetrical diacyl peroxides and unsymmetrical acyclic-cyclic diacyl peroxides that are useful as polymerization initiators.

In accordance with the invention a novel group of diacyl peroxides are provided which are characterized by the presence of a secondary or tertiary carbon atom that is in the alpha or beta position with respect to the carbonyl group of one of the acyl groups in the compound. The compounds are unsymmetrical, i.e., the two acyl groups are different in structure. The novel acyclic molecules of this invention are of relatively low molecular weight and contain from 6–9 carbon atoms.

Unsymmetrical diacyl peroxides having the above structure have been found to be exceptionally fast acting and efficient in terms of yield when used for initiating the polymerization of vinyl chloride in the preparation of polyvinyl chloride. These desirable properties have been established by comparisons with such closely related material as unsymmetrical acyclic diacyl peroxides having structural similarities in terms of the presence of secondary carbon atoms in the alpha and beta positions and with the only difference being a higher molecular weight than the present acyclic diacyl peroxides, i.e., the acyclic compounds used for comparison contain more than 9 carbon atoms. The present invention is based on the discovery that the limited group of acyclic diacyl peroxides of the noted structure which contain 6–9 carbon atoms and unsymmetrical acyclic-cyclic diacyl peroxides behave in a wholly unexpected manner at least in terms of their use in the production of polyvinyl chloride.

In general, the preferred group of compounds of this invention can be described as having the formula:

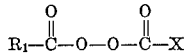

wherein $R_1$ is an alkyl group; wherein $R_1$ and X are different; wherein X is selected from the group consisting of cycloaliphatic groups and the aliphatic group

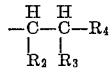

wherein $R_2$, $R_3$ and $R_4$ are selected from the group consisting of alkyl and hydrogen; provided at least one of $R_2$ and $R_3$ is an alkyl group and when $R_3$ is an alkyl group $R_4$ is an alkyl group; and the total number of carbon atoms in $R_1$, $R_2$, $R_3$ and $R_4$ is not more than 5.

2

Best results have thus far been observed where $R_1$ in the above formula is a methyl group so that these peroxides can be referred to as acetyl diacyl peroxides together with appropriate nomenclature for the other half of the molecules.

With respect to the right hand side of the molecule illustrated above, it is to be noted that cyclic aliphatic groups are contemplated in addition to acyclic aliphatic groups. Thus X may be a saturated or partially saturated benzene or naphthene ring for example, and the ring may contain substituents thereon such as an alkyl group. While in general the size of the cyclic group may vary as desired, in most instances it will contain up to about 20 carbon atoms and preferably not more than about 10 carbon atoms to maintain a high active oxygen content in the molecule.

It will be appreciated that the cycloaliphatic groups such as the saturated cyclohexyl and unsaturated cyclohexenyl groups satisfy the requirement of providing a secondary or tertiary carbon atom in the alpha or beta position with respect to the adjacent carbonyl group. In the case of the cyclics, the alpha carbon atom—the carbon atom next adjacent the carbonyl carbon atom—is of a secondary character when considering that it is bonded directly to each of two other carbon atoms participating in the ring structure. This same alpha carbon atom can of course be tertiary if it is substituted with an alkyl group, for example.

With respect to the acyclic aliphatic groups which may be selected for X in the above formula, it will be appreciated that the alpha and beta carbon atoms can also be either secondary or tertiary in character, although in the preferred structure depicted they are secondary. Within the permissible variations, it has been found that significantly superior results in terms of catalyst efficiency and speed is obtained with molecules in which at least the alpha carbon atom contains the branched chain as opposed to the beta carbon atom. Although the acyclic compounds containing the alpha branched carbon atoms are superior to the acyclic beta branched compounds, both of these groups of compounds are, as previously discussed, superior to acyclic compounds having corresponding alpha or beta branched structure but are of a higher molecular weight.

The new compounds can be made in the usual ways for preparing diacyl peroxides. For example, it is known to prepare diacyl peroxides from corresponding acid anhydrides and acid halides such as the chloride by reaction with hydrogen peroxide. Since unsymmetrical diacyl peroxides are sought, a mixture of the desired acid chlorides, for example, would be required. A preferred technique for preparing the new compounds in the instant case is by reaction of a suitable peracid with an acid halide, preferably in the form of an acid chloride. Thus, the preparation of the preferred acetyl type diacyl peroxides of this invention are prepared by the reaction of peracetic acid with an acid chloride containing the group sought in the molecule in addition to the methyl group of the peracetic acid. The following examples will illustrate the preparation of compounds within the scope of this invention:

EXAMPLE 1

Acetyl isovaleroyl peroxide 46.3 grams of 18% peracetic acid (PAA) in acetone (0.11 mole) were cooled to −48° C. and 21.2 grams anhydrous Na₂CO₃ (0.20 mole) were added. Then 12.1 grams of isovaleroyl chloride (0.10 mole) were added to the stirred mixture over a period of 26 minutes at −37 to −40° C. Total reaction time including acid chloride addition was 90 minutes. Then 20 ml. ether and 50 ml. ice H₂O were added. After phase separation, the organic phase was washed with 20 ml. ice water, 20 ml. cold 1% KOH, and 20 ml. ice water again. The product layer was dried using anhydrous Na₂SO₄ and MgSO₄ and concentrated under vacuum using an ice water bath. Active oxygen analysis of the product: theory, 9.99; found, 9.50, 95.1% pure; 66.9% yield.

EXAMPLE 2

Acetyl isobutyryl peroxide 46.3 grams of 18% PAA in acetone (0.11 mole), 15.9 grams of anhydrous Na₂CO₃ (0.15 mole), and 10.7 grams of isobutyryl chloride (0.10 mole) were reacted, and product worked up in a similar manner as Example 1. Product A.O. analysis: theory, 10.95; found, 8.49, 77.6% pure; 42.1% yield.

EXAMPLE 3

Acetyl 2-ethyl butyryl peroxide 13.1 grams of 40% PAA in acetic acid (0.069 mole) was added to 10 ml. acetone and the mixture cooled to −5° C. Then 7.7 grams of 2-ethyl butyryl chloride (0.057 mole) was added to the above stirred mixture. Over 28 minutes at 0 to −3° C., 15.8 grams of pyridine (0.200 mole) was added dropwise to the mixture. After 90 minutes at −3 to −5° C., 20 ml. ether and 50 ml. ice water were added. After phase separation, the organic layer was washed twice with 35 ml. ice water, once with 35 ml. cold NaHCO₃ solution, once with cold dilute H₂SO₄ solution, and twice more with 35 ml. ice water. The product layer was dried with anhydrous MgSO₄ and concentrated under vacuum using an ice water bath. Product A.O. analysis: theory, 9.19; found, 7.86, 85.5% pure; 65.8% yield.

EXAMPLE 4

Acetyl cyclohexane carbonyl peroxide 12.3 grams of 40% PAA in acetic acid (0.064 mole), 25 ml. acetone, 7.9 grams of cyclohexane carbonyl chloride (0.054 mole), and 14.8 grams pyridine (0.187 mole) were reacted and worked up in a similar manner as Example 3, except that diluted KOH solution was used instead of NaHCO₃ solution. Dimethyl phthalate was added to the product layer before concentration under vacuum. Product A.O. analysis: theory, 8.59; found, 6.17, 17.8% pure; 77.8% yield.

In a similar manner other cyclic-acyclic unsymmetrical peroxides can be made by using for example cyclohexene carbonyl chloride or methyl substituted cyclohexane carbonyl chloride in place of the cyclohexane carbonyl chloride used in this example.

The new compounds have unexpected properties as initiators for the preparation of polyvinyl chloride. To demonstrate the superiority of the new compounds, a series of polymerizations of vinyl chloride were carried out with various initiators. Tests were conducted in a 6½ fluid oz. ordinary Coke bottle. 94.0 grams of frozen dispersing solution was added to each Coke bottle. The dispersing solution is a conventional media for conducting suspension polymerization of vinyl chloride and contains water and suspending agents. Each Coke bottle also received 0.00094 mole of peroxide catalyst or initiator and 50.0 grams of vinyl chloride monomer. Since the catalysts were added on a molar basis, differences in molecular weights are discounted and equivalent results should be obtained unless there is a difference in the inherent properties of the catalyst.

After the contents were added to the Coke bottles, they were capped, the contents almost melted, and the bottles placed in a rotating constant temperature bath at 40° C. for 6 hours. The bottles were then cooled and excess monomer vented. The polyvinyl chloride product was filtered, washed and dried.

The following table shows the catalysts employed and the results in terms of weight yield and percent yield of polyvinyl chloride relative to the starting amount of monomer:

TABLE I

| Peroxide | Average PVC* yield, g. | PVC* yield, percent |
|---|---|---|
| Lauroyl peroxide | 6.05 | 12.1 |
| Acetyl 2-ethyl hexanoyl peroxide | 35.5 | 71.0 |
| Acetyl isobutyryl peroxide | 45.05 | 90.1 |
| Acetyl isovaleroyl peroxide | 25.0 | 50.0 |
| Acetyl 3,5,5 trimethyl hexanoyl peroxide | 6.5 | 13.0 |
| Acetyl cyclohexane carbonyl peroxide | 37.8 | 75.6 |
| Acetyl cyclohexene carbonyl peroxide | 14.8 | 29.6 |

*Polyvinyl chloride.

Lauroyl peroxide (sample No. 1) was selected for comparison since this material is most prevalent and typical of catalysts now employed by producers of polyvinyl chloride. Sample No. 3 represents one of the lower molecular weight (6–9 carbon atoms) acyclic aliphatics having a branching at the alpha position. A comparison with sample No. 2, which is also branched at the alpha position, and is analogous to sample No. 3 except for its higher molecular weight, demonstrates the unexpected advantage of the presently claimed group of compounds. Similarly, sample No. 4 is an acyclic alpihatic branched at the beta position within the present invention, and its advantage over a beta branched compound of higher molecular weight (sample No. 5) is shown by the results. Finally, the excellent results possible with the cyclic-acyclic unsymmetrical diacyl peroxides of this invention are illustrated by samples Nos. 6 and 7.

In addition to increased yield, the new compounds of this invention also provide increased speed of reaction. To illustrate this discovery further, experiments in the polymerization of vinyl chloride using the same procedure described in obtaining the results reported in Table I were conducted. The data obtained in terms of percent yield of polyvinyl chloride with respect to time is shown in Table II below. Again, a comparison is made with the standard lauroyl peroxide used in the polyvinyl chloride industry. In this series of experiments catalyst concentration was 0.25% by weight of the monomer and the polymerization reaction was executed at 30° C.

TABLE II.—PERCENT OF POLYVINYL CHLORIDE YIELD

| Peroxide | Time, hr. | | | | | | |
|---|---|---|---|---|---|---|---|
| | 1 | 2 | 4 | 6 | 8 | 12 | 24 |
| Acetyl 2-ethyl hexanoyl peroxide | 3.0 | 8.2 | 26.2 | 40.4 | 55.8 | 74.2 | 81.8 |
| Acetyl isobutyryl peroxide | 4.6 | 16.6 | 49.0 | 71.2 | 87.6 | 87.4 | 87.6 |
| Acetyl isovaleroyl peroxide | 0.4 | 3.2 | 9.8 | 16.8 | 23.8 | 51.6 | 82.6 |
| Acetyl cyclohexene carbonyl peroxide | 1.2 | 3.2 | 10.0 | 12.4 | 17.0 | 27.2 | 40.6 |
| Lauroyl peroxide | | | | | | | 10.6 |

Although the foregoing invention has been described in some detail by way of illustration and example for purposes of clarity and example, it is understood that certain changes and modifications may be practiced within the spirit of the invention as limited only by the scope of the appended claim.

What is claimed is:

1. An asymmetrical diacyl peroxide having the formula:

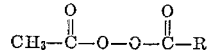

wherein R contains 3-6 carbon atoms and is selected from the group consisting of cyclohexyl, cyclohexenyl,
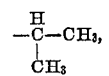
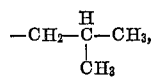
and
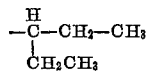
References Cited
UNITED STATES PATENTS
2,567,615 9/1951 Milas.
2,524,318 10/1950 Kharasch _____ 260—613
FOREIGN PATENTS
238,435 5/1962 Australia.
958,067 5/1964 Great Britain.
BERNARD HELFIN, Primary Examiner
W. B. LONE, Assistant Examiner
U.S. Cl. X.R.
260—80